United States Patent
Fischer et al.

(10) Patent No.: US 8,951,399 B2
(45) Date of Patent: Feb. 10, 2015

(54) METHOD FOR PURIFYING LITHIUM-CONTAINING WASTE WATERS DURING THE CONTINUOUS MANUFACTURE OF LITHIUM TRANSITION METAL PHOSPHATES

(75) Inventors: Josef Fischer, Mauern (DE); Johannes Hartel, Vilsbiburg (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 13/202,904

(22) PCT Filed: Feb. 23, 2010

(86) PCT No.: PCT/EP2010/001120
§ 371 (c)(1),
(2), (4) Date: Nov. 7, 2011

(87) PCT Pub. No.: WO2010/097202
PCT Pub. Date: Sep. 2, 2010

(65) Prior Publication Data
US 2012/0055806 A1 Mar. 8, 2012

(30) Foreign Application Priority Data
Feb. 24, 2009 (DE) .......................... 10 2009 010 264

(51) Int. Cl.
*B01D 61/44* (2006.01)
*B01D 61/42* (2006.01)
(Continued)

(52) U.S. Cl.
CPC .............. *B01D 61/422* (2013.01); *C01B 25/37* (2013.01); *C02F 1/4693* (2013.01); *C02F 1/441* (2013.01); *C02F 2101/10* (2013.01);
(Continued)

(58) Field of Classification Search
USPC ............................ 204/529, 531, 534, 537, 52
See application file for complete search history.

(56) References Cited

U.S. PATENT DOCUMENTS 4,636,295 A * 1/1987 Ball et al. ........................ 204/529
4,655,928 A * 4/1987 Milton et al. .................. 210/651
(Continued)

FOREIGN PATENT DOCUMENTS

| DE | 102004012334 A1 | 9/2005 |
|----|-----------------|--------|
| DE | 102005012640 A1 | 9/2006 |

(Continued)

OTHER PUBLICATIONS

Huang et al., Hydrothermal synthesis of LiCoPO4 cathode materials for rechargeable lithium ion batteries, (2005) Materials Letters 59. pp. 578-582.*

(Continued)

*Primary Examiner* — Arun S Phasge
(74) *Attorney, Agent, or Firm* — RatnerPrestia

(57) ABSTRACT

A method for continuously manufacturing lithium transition metal phosphates of the formula $LiMPO_4$, comprising the steps of providing an aqueous reaction mixture containing LION, $H_3PO_4$, and a transition metal sulphate, converting the reaction mixture into a lithium transition metal phosphate, separating the solid lithium transition metal phosphate from the soluble part of the reaction mixture, subjecting the soluble part (diluate) to an electrodialysis, and isolating the part of the electrodialysate that contains an aqueous LiOH solution.

11 Claims, 3 Drawing Sheets

(51) Int. Cl.
*C01B 25/37* (2006.01)
*C02F 1/469* (2006.01)
*C02F 1/44* (2006.01)
*C02F 101/10* (2006.01)
*C02F 103/16* (2006.01)

(52) U.S. Cl.
CPC .. *C02F 2103/16* (2013.01); *C02F 2201/46115* (2013.01); *C02F 2201/4617* (2013.01); *C02F 2201/46185* (2013.01)
USPC .......... 204/528; 204/529; 204/531; 204/534; 204/537

(56) References Cited

U.S. PATENT DOCUMENTS

| | | | |
|---|---|---|---|
| 5,674,800 | A | 10/1997 | Abel et al. |
| 5,910,382 | A | 6/1999 | Goodenough et al. |
| 8,168,150 | B2 | 5/2012 | Hemmer et al. |
| 8,420,215 | B2 | 4/2013 | Vogler et al. |
| 2007/0054187 | A1* | 3/2007 | Nuspl et al. ................ 429/218.1 |
| 2009/0117022 | A1 | 5/2009 | Nuspl |
| 2011/0203929 | A1* | 8/2011 | Buckley et al. ............... 204/537 |

FOREIGN PATENT DOCUMENTS

| | | |
|---|---|---|
| DE | 10 2007 033 460 A1 | 1/2009 |
| EP | 0 634 209 A1 | 1/1995 |
| JP | 54-43174 A | 4/1979 |
| WO | WO 02/083555 A2 | 10/2002 |
| WO | WO 02/099913 | 12/2002 |
| WO | WO 2010/056322 A1 | 5/2010 |

OTHER PUBLICATIONS

Database WPI Week 200506 Thomson Scientific, London, GB AN 2005-051258 & JP. 2004 359538, Dec. 24, 2004 (Abstract).
International Search Report mailed Sep. 15, 2010.
German Office Action mailed Dec. 14, 2009 in corresponding German Application No. 10 2009 010 264.7, including English translation.

* cited by examiner

METHOD FOR PURIFYING LITHIUM-CONTAINING WASTE WATERS DURING THE CONTINUOUS MANUFACTURE OF LITHIUM TRANSITION METAL PHOSPHATES

CROSS REFERENCE TO RELATED APPLICATIONS

This is a National Phase application of PCT application number PCT/EP2010/001120, filed Feb. 23, 2010, which claims priority benefit of German application number DE 10 2009 010 264.7, filed Feb. 24, 2009, the content of such applications being incorporated herein by reference.

FIELD OF THE INVENTION

The present invention relates to a method for purifying lithium-containing waste waters during the continuous manufacture of lithium transition metal phosphates.

BACKGROUND OF THE INVENTION

Lithium metal phosphate compounds, in particular lithium transition metal phosphate compounds, have recently become widely used as cathode and anode materials in secondary ion batteries (U.S. Pat. No. 5,910,382, WO 02/099913). In addition to solid-state syntheses for such lithium transition metal phosphates, wet-chemical methods are also used to manufacture such compounds, such as are described for example in DE 10353266 A1 or in WO 02/083555. The particle morphology of the produced lithium transition metal phosphate can also be particularly well controlled in such wet-chemical methods, for example.

In these wet-chemical methods, lithium hydroxide, which is brought together with an acid solution usually containing phosphoric acid, and with at least one transition metal sulphate, in one of the synthesis steps, is typically used as lithium starting compound. However, a particular problem with the manufacture of lithium transition metal phosphates using such wet-chemical methods is the high loss of lithium ions in the so-called waste brine, the renewed use of which in typical industrial cyclic processes, in particular when processing and recovering the starting materials, is made difficult by high levels of foreign ions, especially by sulphate.

Hitherto, only purifying methods that are extremely costly in process engineering terms have been known for reprocessing the lithium-containing waste brine. A further possibility is described for example in DE 10 2007 033460, wherein barium sulphate is precipitated by adding barium hydroxide and LiOH remains in solution. However, a disadvantage of this method is the large amount of barium sulphate produced, obtainable only with difficulty for further industrial use in acceptable so-called blanc fixe types.

DESCRIPTION OF THE INVENTION

The object of the present invention was therefore to make available a further novel method which makes possible a profitable and efficient re-use and processing of lithium- and sulphate ion-containing waste waters in particular during the continuous manufacture of lithium transition metal phosphate compounds.

This object is achieved by a method for purifying lithium-containing waste waters in a cyclic process for the continuous manufacture of lithium transition metal phosphates of the formula $LiMPO_4$ comprising the steps of:

a) providing an aqueous reaction mixture containing LiOH, $H_3PO_4$ as well as a transition metal sulphate
b) converting the reaction mixture into a lithium transition metal phosphate
c) separating the solid lithium transition metal phosphate from the soluble part of the reaction mixture
d) subjecting the soluble part (diluate) to an electrodialysis
e) isolating the part of the electrodialysate that contains an aqueous LiOH solution.

The electrodialysis step serves to concentrate or deplete ionic components from the electrically uncharged solution of the lithium- and sulphate ion-containing waste waters which typically contain predominantly lithium sulphate.

In the case of the so-called bipolar technique preferably used in the present case, by using bipolar membranes (see e.g. DE 10 2004 012334 A1), the splitting and separation of the diluate into acids and bases and their enrichment also advantageously occur. The ions permeate in a DC ratio according to their charge in the direction of the oppositely charged electrode. The anions which are negatively charged as in the present case $SO_4^{2-}$ migrate to the anode, the cations, i.e. $Li^+$ accordingly to the cathode. Ion exchange membranes are used to selectively control the migration of the ions. Anion exchange membranes (AAMs) allow only anions to permeate, while the cation exchange membranes (CAMs) are permeable only for cations.

In electrodialysis units used according to aspects of the invention, several membranes are typically connected in parallel, with the result that the inflowing crude solution stream is split up into the chambers. A chamber consists of a pair of cells, thus an anion and a cation exchange membrane as well as the associated bipolar membranes. The input electric field is applied at right angles to the direction of flow. After passing through the first membrane an ion cannot continue the movement in the direction of the oppositely charged electrode, because it encounters a membrane with the same charge. Concentration and dilution thus alternate in the chambers. In the bipolar membrane, one side is positively, and the other negatively, charged. The result of this is that the separated ions are no longer brought together. Autocatalytic water splitting then occurs in the bipolar membrane to maintain ion migration. While $H^+$ ions reach the acid side, the $OH^-$ ions are guided to the base side. The electrodes are rinsed with a separate solution in order to prevent the production of unwanted substances by the electrode reactions.

The thus-obtained aqueous LiOH solution from step e) is preferably returned to the reaction mixture in step a). The treatment quota (i.e. recovery) of LiOH from the spent brine is usually ca. 90%. Although treatment quotas of more than 90%, e.g. >95%, or >97%, are also possible by means of the method according to aspects of the invention, these treatment quotas are unfavourable in energy terms during process control. This means that only as much "fresh", i.e. not recovered, LiOH must still be added as is consumed during the conversion to the product, namely the lithium transition metal phosphate compound.

$H_2SO_4$ forms in the other chamber during the electrodialysis. Advantageously, this can equally be converted with a transition metal in a further step into a transition metal sulphate, which, in a particularly advantageous embodiment of the present invention, is then also added to the reaction mixture in step a). Thus according to aspects of the invention a nearly complete cyclic process with recovery or processing of the reaction products from the manufacture of lithium transition metal phosphates is provided.

The transition metal sulphate for use in the method according to aspects of the invention is selected from at least one of the group consisting of the sulphates of Fe, Co, Ni, Ti, Cu, Nb, Mo, Cu, Zn, Zr, Cr, Ru. Iron sulphate is preferred. Doped or mixed doped lithium iron phosphate, $LiM_xFe_{1-x}PO_4$ with x<1 can also be obtained by using several different transition metal sulphates for example in particularly preferred embodiments of the present invention. In this case the transition metal M is at least one of the group consisting of Co, Ni, Ti, Cu, Nb, Mo, Cu, Zn, Zr, Cr, Ru. Non-limiting examples are e.g. niobium-, nickel- and cobalt-doped lithium iron phosphate.

In further preferred developments of the present invention, a transition metal hydroxide can additionally be used in step a) of the method according to aspects of the invention. This is selected from the hydroxides of Co, Ni, Ti, Cu, Nb, Mo, Cu, Zn, Zr, Cr, Ru, with the result that doped lithium iron phosphate, in particular those already mentioned above, can be obtained with this method variant if iron(II) sulphate is simultaneously used as transition metal sulphate. However, in this method variant the balancing of the pH of the reaction mixture by a suitable extra addition of phosphoric acid is important in order to compensate for the influence of the basic transition metal hydroxide.

In yet more, particularly preferred embodiments of the present invention the soluble part (the so-called diluate) of the reaction mixture is subjected, after conversion in step b) and separation of the soluble portion in step c), to a concentration in a step $c_1$) before the electrodialysis step d), in order to optimize the result and the yield of the bipolar electrodialysis.

The soluble part is quite particularly preferably concentrated by reverse osmosis and alternatively or in further preferred embodiments of the method according to aspects of the invention optionally in addition by "single" (monopolar) electrodialysis.

By "single electrodialysis" is meant the use of exclusively monopolar ion exchange membranes during electrodialysis.

With this arrangement, the solution is further concentrated, beyond the level of reverse osmosis, i.e. lithium sulphate is concentrated.

In another further particularly advantageous development of the method according to aspects of the invention, the depleted diluate obtained in step d) of the method according to aspects of the invention is recycled and likewise subjected to concentration, preferably as stated by reverse osmosis and/or single electrodialysis in step $c_1$).

The reverse osmosis for the concentration of the soluble part of the reaction mixture is preferably carried out with the help of a multi-stage reverse osmosis (RO). Permeate is also obtained which is so strongly depleted that it can serve as demineralized water in the core process to treat the reaction mixture and for cleaning purposes.

Like nanofiltration, reverse osmosis is a pressure-driven membrane method that is used to separate or concentrate the predominantly aqueous mixtures. The maximum concentration rate is determined by the applying pressure and osmotic pressure of the solution. The permeates produced are low in salt and can be re-used for cleaning purposes. Toray UTC 80, Dow Filmtec SW 30, Dow Filmtec NF 90 as well as GE Water Desal SC and Hydranautics SWC4 are examples of typical reverse osmosis membranes that can be used.

As stated, in further preferred embodiments of the method according to aspects of the invention a further concentration of the concentrate from the reverse osmosis step can take place with the help of a so-called "single" (monopolar) electrodialysis (which can also, as already described, be used as an alternative to reverse osmosis). The concentrate from this method step is input medium for step d), the depleted diluate is then returned to the previous step $c_1$).

After the preferably multi-stage reverse osmosis, a solution with ca. 130 g/l "salt" content, predominantly $Li_2SO_4$, is obtained. This solution can then be further concentrated to ca. 180-200 g/l by "single" (monopolar) electrodialysis and finally fed into the bipolar electrodialysis. A particular advantage of this is that the parameter, advantageous in process engineering terms, of as high as possible a concentration of the input solution into the bipolar electrodialysis is satisfied. The result of as high as possible an input concentration of the solution is firstly that the energy yield is positively influenced and secondly that the necessary membrane surface in costly bipolar membranes is reduced.

The invention is explained in more detail with reference to the following embodiment examples and figures which are to be considered non-limiting.

BRIEF DESCRIPTION OF THE DRAWINGS

FIG. 4 shows the schematic test structure of an electrodialysis device with bipolar technology which is used in the cyclic process according to aspects of the invention. The feed solution is pumped out of a temperature-controllable receiver over the membranes. In the DC field of the electrodialysis stack, the ions migrate into the acid or base chamber which are filled with water at the beginning (the acid chamber is set to a pH of 2 with $H_2SO_4$ for stability reasons). The depleted diluate and the formed acid and base are recycled into the receivers and a batchwise depletion of the feed is thus achieved.

In the industrial-scale process according to the present invention, the process is operated continuously such that the part-streams aqueous solution/diluate, acid and base fed into the bipolar electrodialysis are transported via the respective receivers in a cycle over the so-called electrodialysis stack (i.e. the majority of the membranes) and a smaller part of each of these cyclic flows is sluiced out. The respective desired concentration of the part-stream can be set via the flow-over ratio.

Tokuyama CMS (mono-cations permselectve membrane), Tokuyama ACM (proton-blocker anion exchange membrane) as well as Tokuyama BP-1 as bipolar membrane are examples of membranes that can be used for the bipolar electrolysis.

The electrodialysis was typically carried out at 15 V voltage constant at a temperature of 35° C. The flow over the membranes was roughly 50 l per hour per chamber. A four percent sodium sulphate solution was used as electrode rinse solution. However, an $Li_2SO_4$ solution is preferred instead of the Na sulphate solution so as not to introduce "foreign ions" into the core process and thus into the lithium transition metal phosphate.

Figure 1:
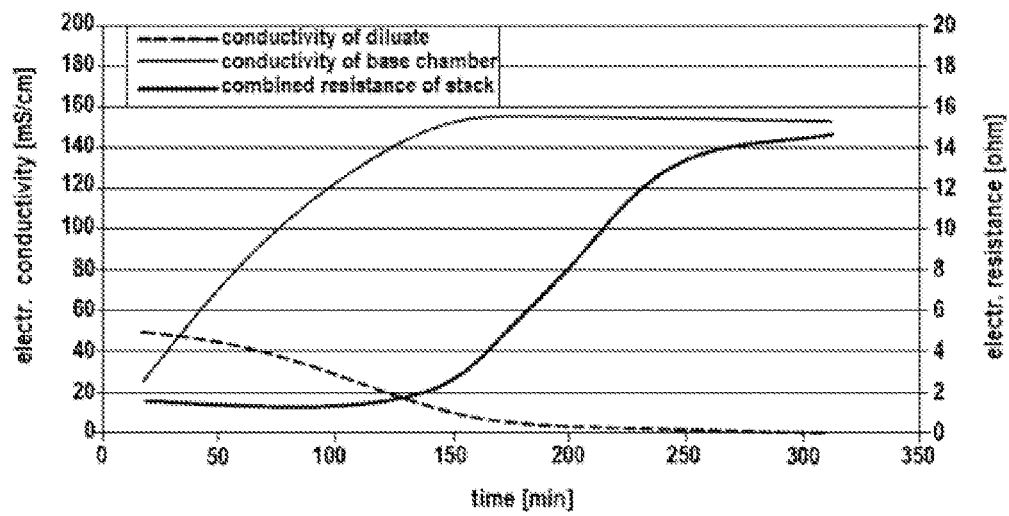
FIG. 1: the process data of an electrodialysis.

FIG. 1 shows that, while the diluate chamber is progressively depleted of salts, the concentration of LiOH in the base chamber is progressively increased. Because of the depletion of the diluate chamber, the electric resistance in the stack is progressively increased.

Figure 2:
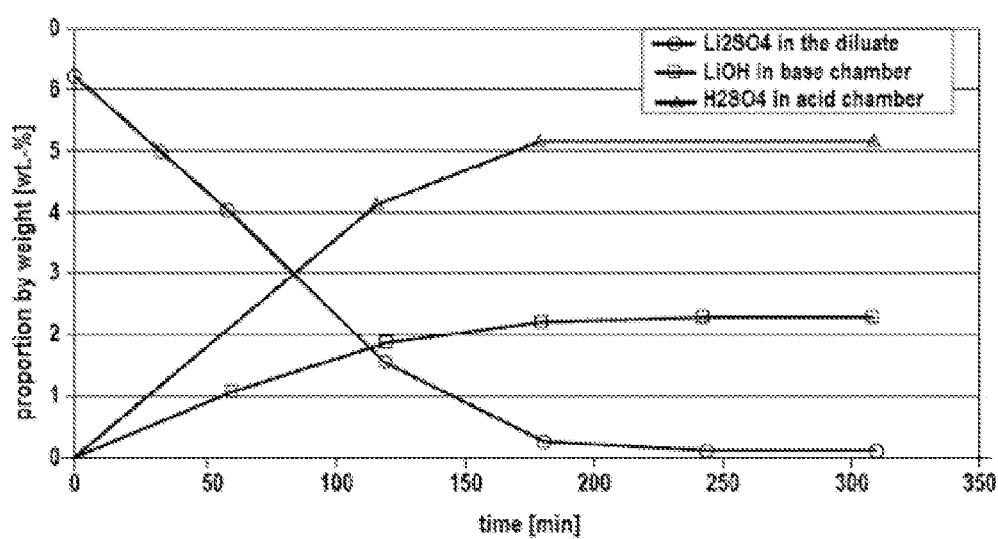
FIG. 2: the course of the concentrations of the different chambers during the electrodialysis.

FIG. 2 confirms the results from FIG. 1 and shows the course of the concentration in the different chambers of the electrodialysis. The current yield shows how much of the expended current can be used for depletion or enrichment and how much current is lost through effects such as back-diffusion and current leakage.

Figure 3:
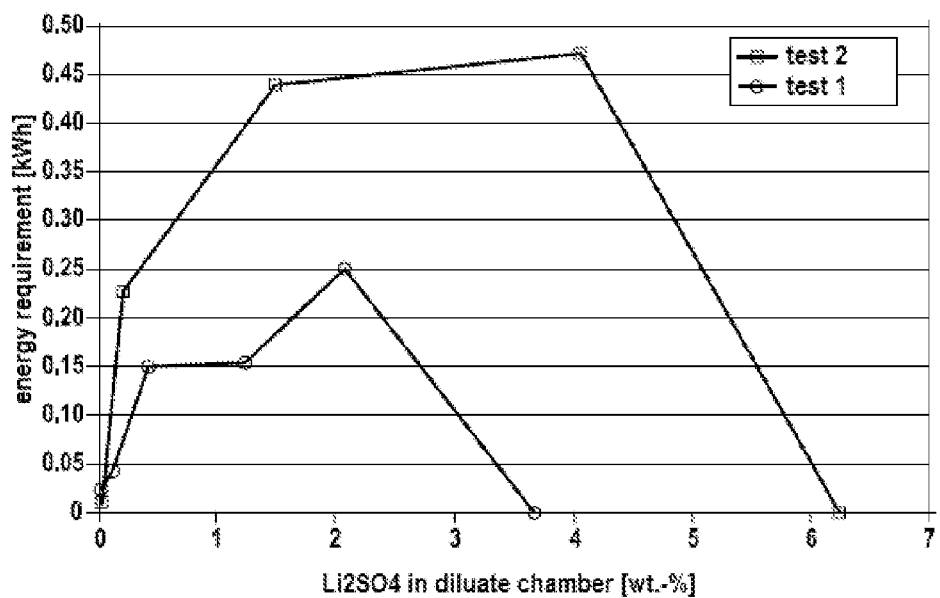
FIG. 3: the absolute energy requirement during the electrodialysis.
Figure 4:
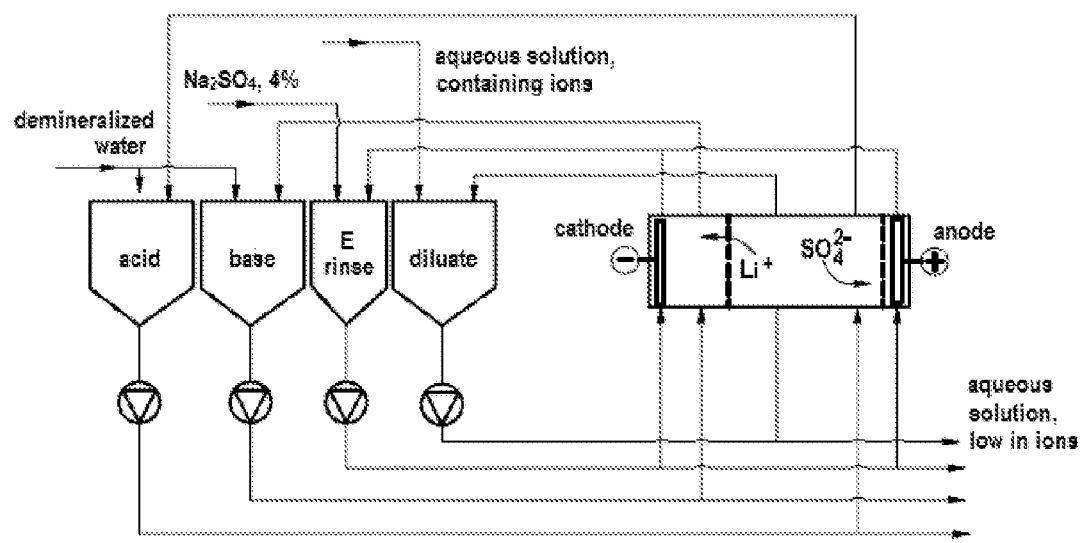
FIG. 4: the schematic test structure of an electrodialysis apparatus.

The energy requirement, which is shown in FIG. 3, is also important. The graph shows that it is advantageous to start with a high lithium sulphate concentration and not to stop depletion only after depletion is complete. Although the absolute energy requirement falls towards the end of depletion, the energy cannot be used efficiently. In the case of the higher concentration in the base and acid chambers an increased energy requirement is necessary to avoid back-diffusion. Within the framework of the method according to aspects of the invention the quantity passed through the electrodialysis was ca. 1.9 t per hour concentrated waste water, the concentration of the medium after the reverse osmosis was in a range of from 90 to 140 g per liter, preferably ca. 130 g per liter $Li_2SO_4$. After further concentration by "single" (monopolar) electrodialysis the concentration was ca. 180 to 200 g per liter. The current density was ca. 660 $A/m^2$ and the current yield 70%.

Figure 5:
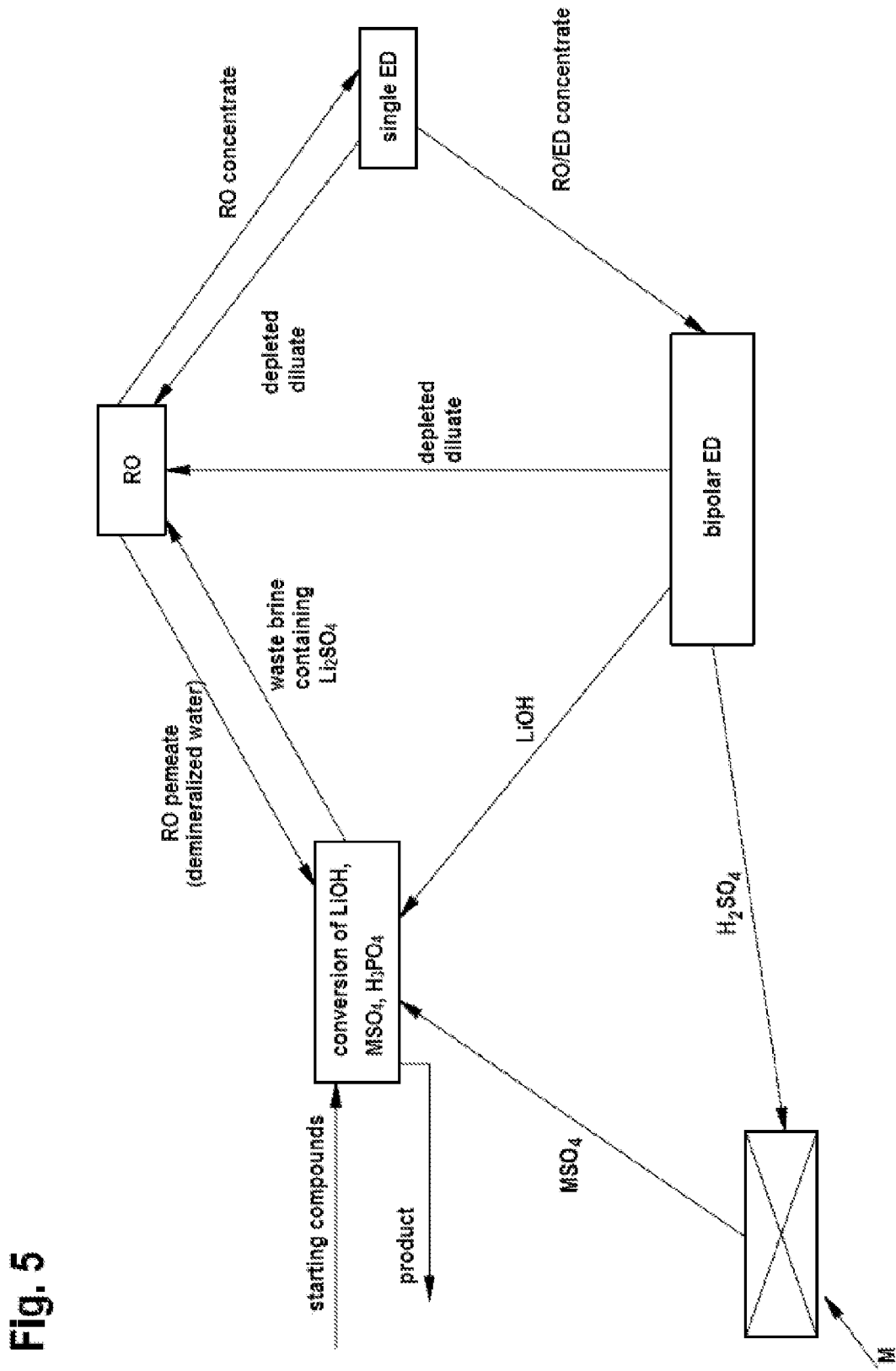
FIG. 5: the schematic course of the method.

FIG. 5 shows a preferred embodiment in schematic representation of the method according to aspects of the invention.

The reaction mixture comprising LiOH, $MSO_4$, $H_3PO_4$, wherein $MSO_4$ is a transition metal sulphate for example iron sulphate, nickel sulphate, niobium sulphate, cobalt sulphate etc., is converted under the conditions described above. The starting compounds are supplied, here in particular LiOH which has not been recovered or converted into the product lithium transition metal phosphate compound as well as $H_3PO_4$.

After the conversion, firstly a waste brine containing $Li_2SO_4$ forms, secondly the product, the lithium transition metal phosphate compound, is discharged.

The waste brine containing $Li_2SO_4$ is subjected to a multi-stage reverse osmosis (RO) and the RO permeate which has the quality of demineralized water is recycled to the reaction mixture for the conversion. The concentrate of the reverse osmosis is then subjected to a single (monopolar) electrodialysis and the diluate from the single (monopolar) electrodialysis is returned to the reverse osmosis. The concentrate from the combined reverse osmosis and electrodialysis enrichment is then subjected to a bipolar electrodialysis, wherein the formed LiOH is recycled into the reaction mixture in the cyclic process, while the formed sulphuric acid is used for the conversion with a transition metal. Once the reaction with a metal M, for example Fe, Co, Ni, Cr, Nb etc. has taken place, the formed metal sulphate or sulphates can also be introduced into the reaction mixture.

The invention claimed is:

1. A method for purifying lithium-containing waste waters during the continuous manufacture of lithium transition metal phosphates of the formula $LiMPO_4$ starting from LiOH, comprising the steps of:
    a) providing an aqueous reaction mixture containing LiOH, $H_3PO_4$, and a transition metal sulphate;
    b) converting the reaction mixture into a lithium transition metal phosphate;
    c) separating the solid lithium transition metal phosphate from the soluble part of the reaction mixture;
    d) subjecting the soluble part (diluate) to a bipolar electrodialysis; and
    e) isolating the part of the electrodialysate that contains an aqueous LiOH solution;

wherein the soluble part (diluate) is subjected to a concentration in a step c1) before the electrodialysis step d) by reverse osmosis and alternately or in addition by monopolar electrodialysis, and feeding the concentrate into the bipolar electrodialysis.

2. A method according to claim 1, wherein the aqueous LiOH solution from step e) is returned to the reaction mixture according to step a).

3. A method according to claim 1, wherein $H_2SO_4$ forms during the bipolar electrodialysis.

4. A method according to claim 3, wherein a transition metal is converted into a transition metal sulphate with the $H_2SO_4$ according to claim 3.

5. A method according to claim 4, wherein the transition metal sulphate is added to the reaction mixture in step a).

6. A method according to claim 4, wherein the transition metal is selected from at least one of the group consisting of Fe, Co, Ni, Ti, Cu, Nb, Mo, Cu, Zn, Zr, Cr, Ru.

7. A method according to claim 1, wherein a transition metal hydroxide is also used in step a).

8. A method according to claim 7, wherein the transition metal hydroxide is selected from the hydroxides of Co, Ni, Ti, Cu, Nb, Mo, Cu, Zn, Zr, Cr, Ru.

9. A method according to claim 1, wherein the concentration of the soluble part takes place through reverse osmosis.

10. A method according to claim 9, wherein the concentration in step c1) takes place by reverse osmosis and monopolar electrodialysis.

11. A method according to claim 1, wherein the concentration in step c1) of the soluble part (diluate) takes place through monopolar electrodialysis.

* * * * *